Figure 1:
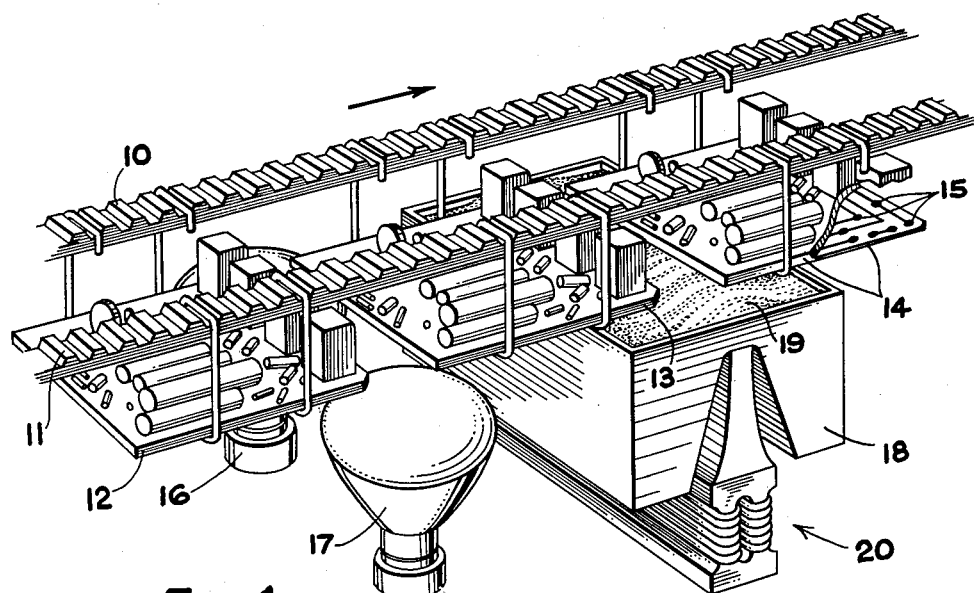

April 9, 1963  J. F. JOHNS  3,084,650
ULTRASONIC SOLDERING SYSTEM
Filed July 27, 1960

INVENTOR.
JAMES F. JOHNS
BY William J. Elliott
ATTORNEY 3,084,650
Patented Apr. 9, 1963

3,084,650
ULTRASONIC SOLDERING SYSTEM
James F. Johns, Goleta, Calif., assignor to Curtiss-Wright Corporation, a corporation of Delaware
Filed July 27, 1960, Ser. No. 45,678
2 Claims. (Cl. 113—126)

This invention relates to soldering apparatus and more particularly to a novel ultrasonic soldering system for automatically soldering joints in an assembly line process.

Present day automatic soldering systems usually employ the "dip" method in which various joints to be soldered together are simultaneously dipped in a solder bath. A careful pre-cleaning operation of the joints is generally required, and the usual flux is used to insure a secure soldered connection. Even when proper pre-cleaning and suitable use of flux is carried out, there still may result some joints which require a post-soldering retouch.

In addition to the above, in an assembly line operation in which, for example, a plurality of joints on the bottom surface of several chassis are to be soldered, the smooth flow of the assembly line is disrupted to the extent that each particular chassis must undergo the dip operation. This interruption together with the necessity of pre-cleaning and flux application increases the overall time of assembly operation with the attendant increase in cost and labor.

With all of the foregoing in mind, it is a primary object of this invention to provide a greatly improved automatic soldering system in which the foregoing disadvantages of present-day systems are overcome.

More particularly, it is an object to provide a novel ultrasonic soldering system which eliminates the steps of pre-cleaning and flux addition to the end that both time and labor in assembly are saved.

Another object of the invention is to provide an improved automatic soldering system in which various chassis joints to be soldered may be moved continuously through the system without any interruption or change in the direction of motion in an assembly line operation.

More general objects of the invention are to provide a novel ultrasonic soldering system in which a more secure joint can be made in a shorter period of time and with less expense and labor.

Briefly, these and other objects and advantages of this invention are attained by providing a solder bath including means for generating a standing wave of liquid solder. This standing wave of solder is disposed transversely to the path of travel of various chassis moving along an assembly line. Also included is an ultrasonic generating means for imparting ultrasonic energy to the standing wave. With this arrangement, the various joints may be passed through the standing wave, the ultrasonic energy in the wave effecting proper cleaning of the joints and the solder in the wave itself effecting complete soldering thereof. By employing means for pre-heating the joints prior to passing to the solder bath, the resulting soldering can be effected in a relatively short period of time.

Figure 2:
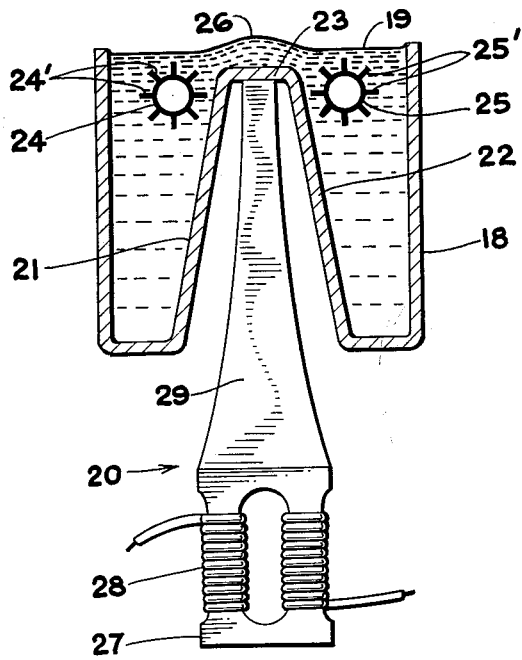

A better understanding of the invention will be had by referring to one embodiment thereof as illustrated in the accompanying drawings, in which:

FIGURE 1 is a schematic perspective view illustrating the ultrasonic soldering system of this invention; and FIGURE 2 is an enlarged elevational view partly in cross section illustrating certain details of principal components employed in the system of FIGURE 1.

Referring first to FIGURE 1, there are shown conveyor lines 10 and 11 for transporting a plurality of chassis 12, 13, and 14. Each of these chassis includes joints on its under side such as indicated at 15 for the chassis 14. The conveyor means 10 and 11 is arranged to successively move the various chassis in a given path from left to right as indicated by the arrow in FIGURE 1.

The automatic ultrasonic soldering system itself may include preheat radiation lamps 16 and 17 disposed adjacent the path for preheating the various joints on the under side of the chassis. Also included is a solder bath container 18 holding a liquid solder bath 19. Cooperating with this structure is an ultrasonic generating means schematically indicated at 20.

Referring now particularly to FIGURE 2, it will be noted that the container 18 includes a central partition means in the form of sloping partition walls 21 and 22 converging upwardly to terminate in an end 23 disposed below the level of the liquid solder bath 19. This end runs transversely to the path of the various chassis when moved by the conveyor means as described in connection with FIGURE 1 and extends for a distance corresponding to the width of the chassis themselves.

Disposed within the solder bath 19 are standing wave generating means in the form of paddle rollers 24 and 25 on opposite sides of the central partition structure and provided with radially extending paddles 24' and 25', respectively. By rotating these paddles with any suitable power means (not shown) in opposite directions such that the inner facing or opposed paddles move upwardly, there will be generated currents in the solder bath establishing a hump or standing wave of solder as indicated at 26. By making the rollers co-extensive with the transverse end 23 of the central partition, which in turn corresponds substantially to the transverse width of the container 18 and of the various chassis passing thereover, the standing wave itself will extend transversely a sufficient distance to engage all of the various joints on the under side of each of the chassis as the same are passed therethrough.

The ultrasonic generating means 20 includes a transducer portion 27 excited by coils 28 and an acoustical transformer 29 extending upwardly to engage the under side of the end 23 of the central partition structure. With this arrangement, ultrasonic energy is transmitted through the medium of the acoustic transformer 29 to the end 23 and thus concentrated in and imparted principally to the standing wave of solder 26. The oscillator for exciting the coils 28 (not shown) may be set to generate ultrasonic energy of frequency ranging anywhere from 20 to 80 kilocycles.

In the operation of the soldering system as described in connection with FIGURES 1 and 2, various chassis are suspended from the conveyor means 10 and 11 as schematically illustrated in FIGURE 1 and caused to move in the direction of the arrow. As the chassis pass over the pre-heating lamps 16 and 17, the various joints are raised to a relatively high temperature. As the chassis continuously moves to the right, the various joints will be engaged by the standing wave 26 and the ultrasonic energy in this wave will result in a thorough cleaning of the joints by the cavitation phenomenon. Moreover, sufficient solder will be applied to the joints so that as the chassis leaves the standing wave, the solder will cool thereon to provide a properly soldered connection.

From the foregoing, it will be evident that the heretofore required pre-cleaning step and attendant labor associated therewith has been eliminated. Further, flux application has also been eliminated. Finally, the resulting soldered joints are of sufficiently high quality that no retouch soldering is necessary.

As a further advantageous consequence of the above-described system, it will be evident that the assembly line operation may continue in a smooth manner throughout the soldering of the various connections. Thus, the chassis may be moved at a constant speed over the pre-heating lamps and the standing wave of solder, and there is not required any stopping or changing of direction of the chassis during the soldering step. As a result, the entire soldering process can be achieved in a shorter period of time with increased quality in the soldered joints.

While the invention has been described with respect to a specific example of an automatic soldering operation in connection with electronic chassis, it should be understood that various changes and modifications falling clearly within the scope and principles of the invention will occur to those skilled in the art. The ultrasonic system is therefore not to be thought of as limited to the specific example schematically set forth and described.

What is claimed is:

1. Apparatus for automatically performing soldering operations on successive chassis, comprising:
   (a) a conveyor for transporting said chassis in a generally horizontal disposition with the solderable underside of the chassis accessible;
   (b) a trough-like, open-top solder bath container disposed below and spaced from said chassis underside,
      (b1) said container having a bottom wall which in turn has, in order in the direction of the conveyor path, a first end portion, a middle portion, and a second end portion,
      (b2) said middle portion being formed to rise above said end portions, the rise being provided on both the exterior and interior surfaces of the bottom wall so as to form in said exterior surface a hollow, and so as to constitute, interiorly of said container, each of said end portions a bottom for a dependent cavity for said container,
      (b3) the container, hollow, and cavities extending in a direction transverse to said conveyor path, over a length which as a minimum substantially spans the width of solderable chassis,
      (b4) said container being normally filled to an interface level which is above the peak of said rise,
   (c) a pair of oppositely rotating paddle wheels, each disposed within a respective container-cavity and axially extending therewithin in said transverse direction over a length which as a minimum substantially spans the solderable chassis width, for urging solder towards the said peak, the urging action of both paddle wheels forming a standing wave-crest of solder above said peak, said wave-crest rising from said interface to engage a conveyed chassis underside to solder the same, and being approximately coextensive in said transverse direction with said paddle wheels;
   (d) and an ultrasonic transducer means extending within said hollow over a length which as a minimum substantially spans the solderable chassis width to direct ultrasonic energy at the chassis portion then being soldered for substantially simultaneously cleaning such portion.

2. Apparatus for automatically performing soldering operations on successive chassis, comprising:
   (a) a conveyor for transporting said chassis in a generally horizontal disposition with the solderable underside of the chassis accessible;
   (b) a trough-like, open-top solder bath container disposed below and spaced from said chassis underside, and having a plurality of walls extending in a direction transverse to the conveyor path over a length which as a minimum substantially spans the solderable chassis width,
      (b1) said plurality of walls including:
         (b1.1) in order in the direction of the conveyor path, a first, second, third, and fourth generally vertical wall, each spaced from each of the others,
         (b1.2) and also in order in the direction of the conveyor path, a first, second, and third generally horizontal wall, each spaced from each of the others,
      (b2) the second horizontal wall lying below the interface level to which said container is normally filled, and joining the upper edges of the second and third vertical walls to form with them a tunnel,
      (b3) the first horizontal wall joining the lower edges of the first and second vertical walls to form with them one dependent cavity for said container, and the third horizontal wall joining the lower edges of the third and fourth vertical walls to form with them a second dependent cavity for said container,
   (c) a pair of oppositely rotating paddle wheels, each disposed within a respective container-cavity and axially extending therewithin in said transverse direction over a length which as a minimum substantially spans the solderable chassis width, for urging solder towards above said second horizontal wall, the urging action of both paddle wheels forming a standing wave-crest of solder above said second horizontal wall, said wave-crest rising from said interface to engage a conveyed chassis underside to solder the same, and being approximately coextensive in said transverse direction with said paddle wheels;
   (d) and an ultrasonic transducer means extending within said tunnel over a length which as a minimum substantially spans the solderable chassis width to direct ultrasonic energy at the chassis portion then being soldered for substantially simultaneously cleaning such portion.

References Cited in the file of this patent

UNITED STATES PATENTS

| 316,896 | Hubel et al. | Apr. 28, 1885 |
| 2,529,699 | Lach | Nov. 14, 1950 |
| 2,554,701 | Hackett et al. | May 29, 1951 |
| 2,803,731 | Coburn | Aug. 20, 1957 |
| 2,824,543 | Brown | Feb. 25, 1958 |
| 2,869,497 | Lehner | Jan. 20, 1959 |
| 2,926,622 | Petermann | Mar. 1, 1960 |
| 2,993,272 | Carlzen et al. | July 25, 1961 |

FOREIGN PATENTS

| 798,454 | Great Britain | July 23, 1958 |
| 846,961 | Great Britain | Sept. 7, 1960 |